United States Patent [19]

Ahlgren et al.

[11] Patent Number: 4,891,555
[45] Date of Patent: Jan. 2, 1990

[54] METAL VAPOR DISCHARGE LAMPS

[75] Inventors: Frederic F. Ahlgren, Shaker Heights; John M. Davenport, Lyndhurst; Richard L. Hansler, Pepper Pike; John J. Karikas, Shelby, all of Ohio

[73] Assignee: General Electric Company, Schenectady, N.Y.

[21] Appl. No.: 285,576

[22] Filed: Dec. 16, 1988

Related U.S. Application Data

[62] Division of Ser. No. 798,646, Nov. 15, 1985, Pat. No. 4,810,932.

[51] Int. Cl.[4] .................. H01J 61/30; H01J 61/34
[52] U.S. Cl. ...................................... 313/634; 313/25; 313/318
[58] Field of Search .................. 313/25, 634, 635, 318

[56] References Cited

U.S. PATENT DOCUMENTS 3,665,235  5/1972  Hugot ........................... 313/634 X
3,753,019  8/1973  Hellman ........................ 313/635 X
3,889,142  6/1975  Keeffle ......................... 313/635 X Primary Examiner—Donald J. Yusko
Assistant Examiner—Sandra L. O'Shea
Attorney, Agent, or Firm—John P. McMahon; Stanley C. Corwin; Fred Jacob

[57] ABSTRACT

Flush and pump flush processes yielding light sources for incandescent and metal vapor discharge lamps are disclosed. The flush and pump flush processes also yield lamps that are particularly suitable for deposition of a reflective coating on its outer surface. For such reflective coated light sources, the associated lamp leads are encased in glass and therefore are protected against any deleterious reactions that may otherwise result from the deposition of the reflective coating process. The light sources yielded by the flush and pump flush processes of the present invention are advantageous in reducing the mounting arrangement of the lamps in which the light sources are housed.

6 Claims, 11 Drawing Sheets

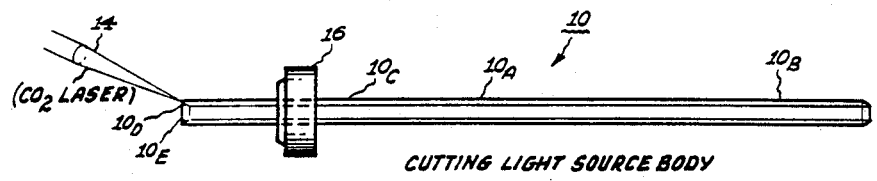
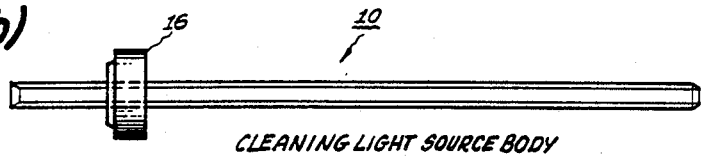
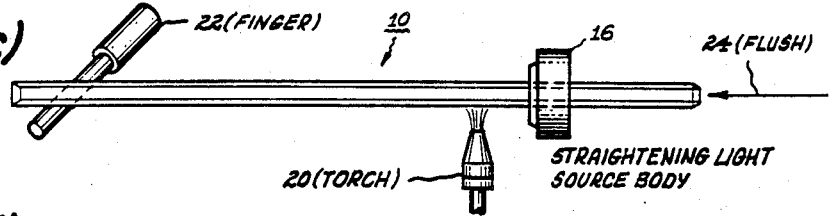
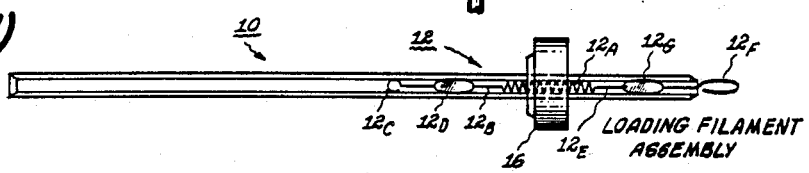
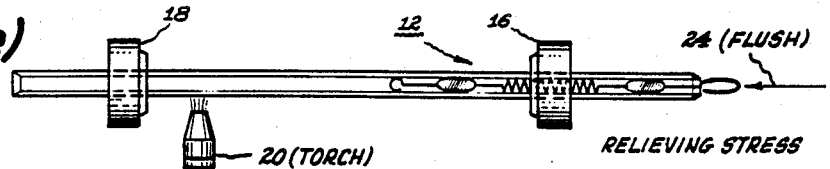
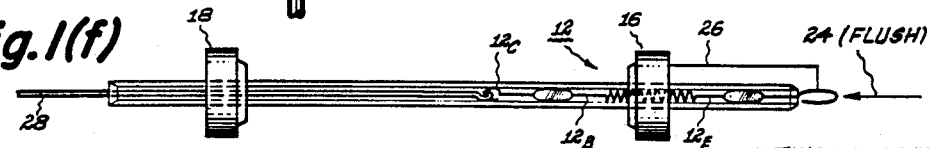
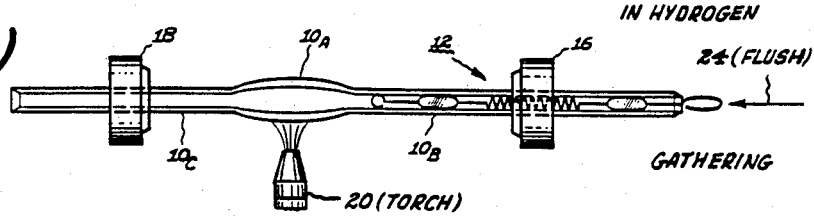

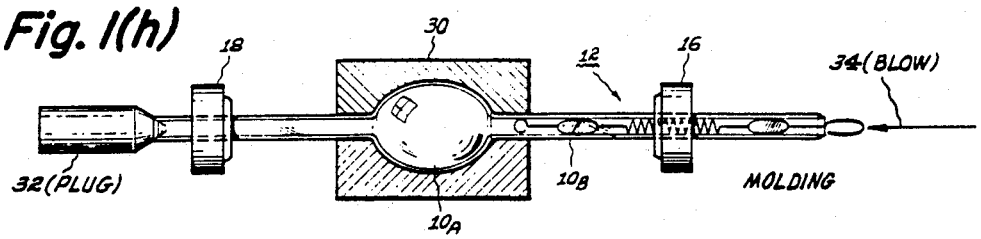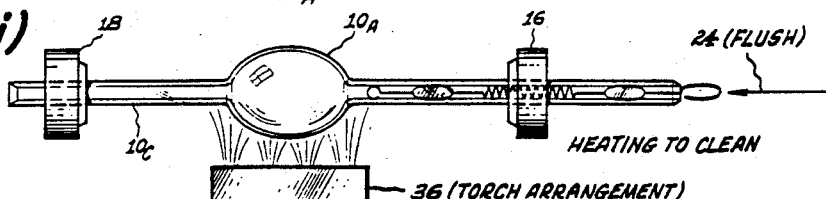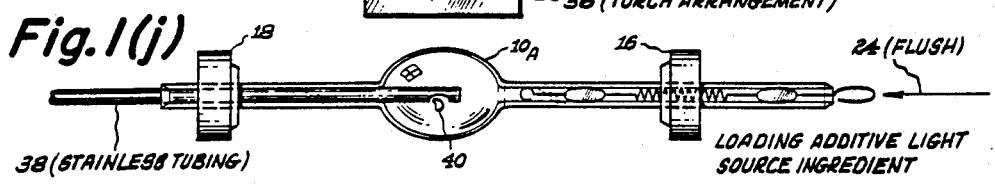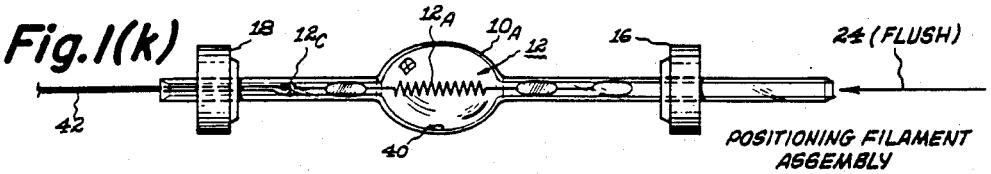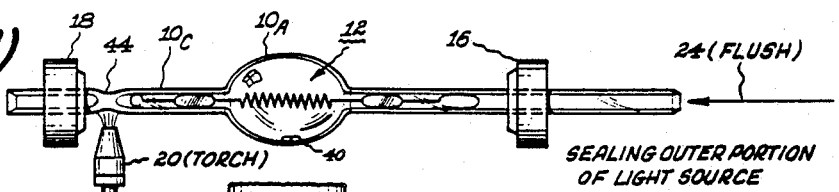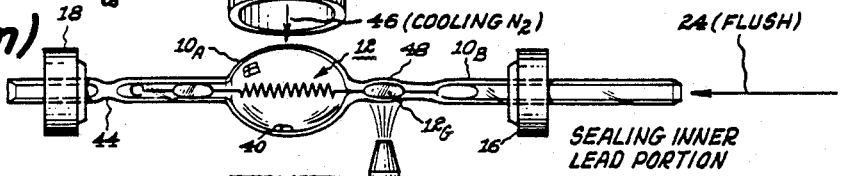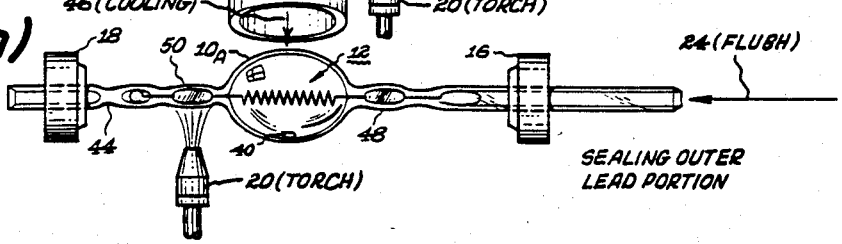

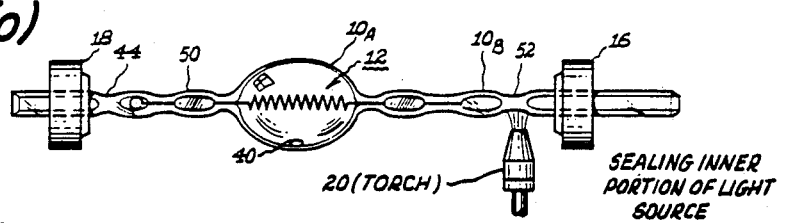
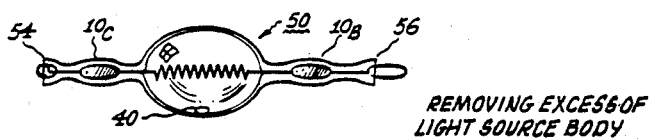
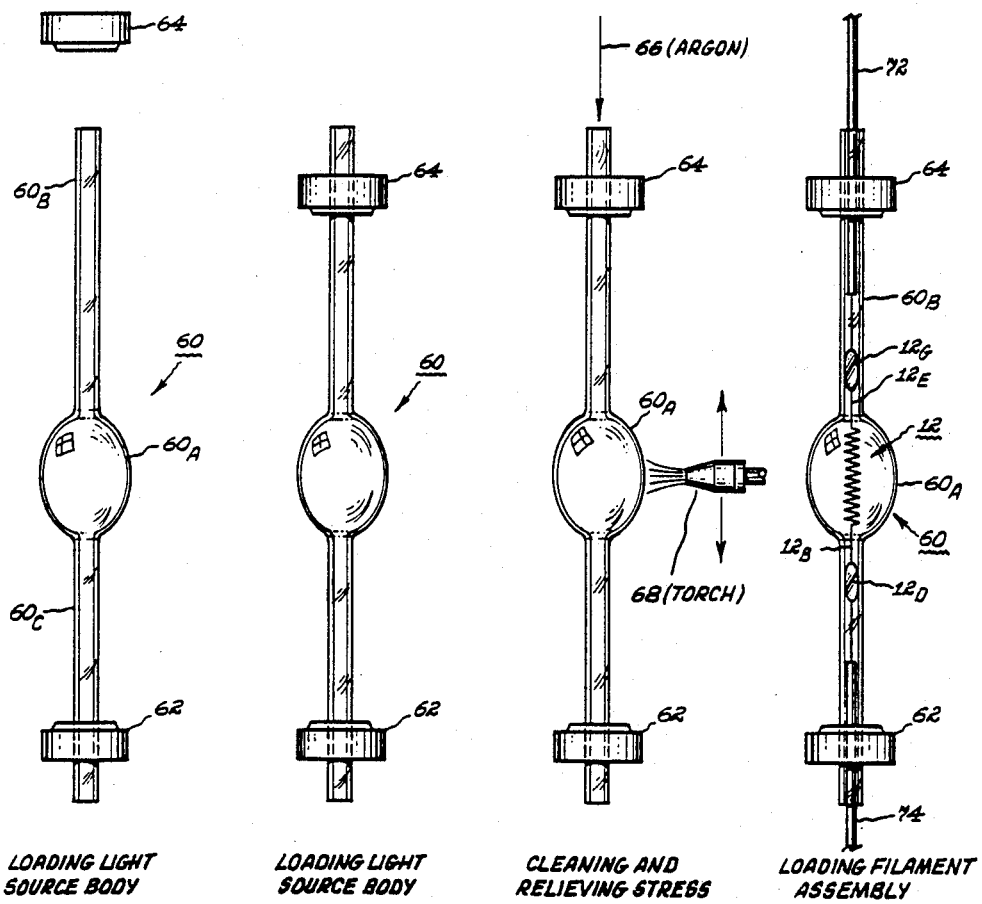

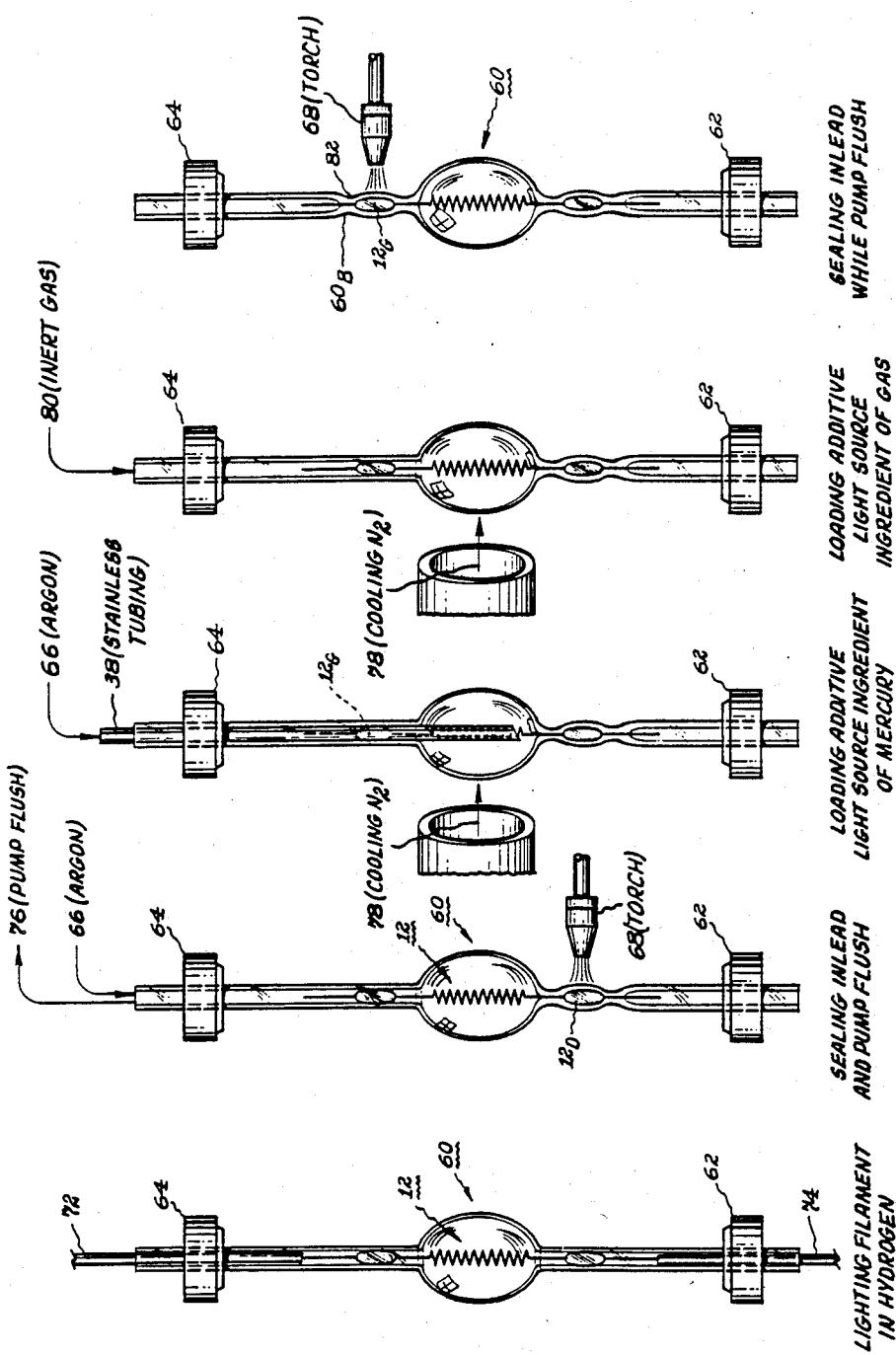

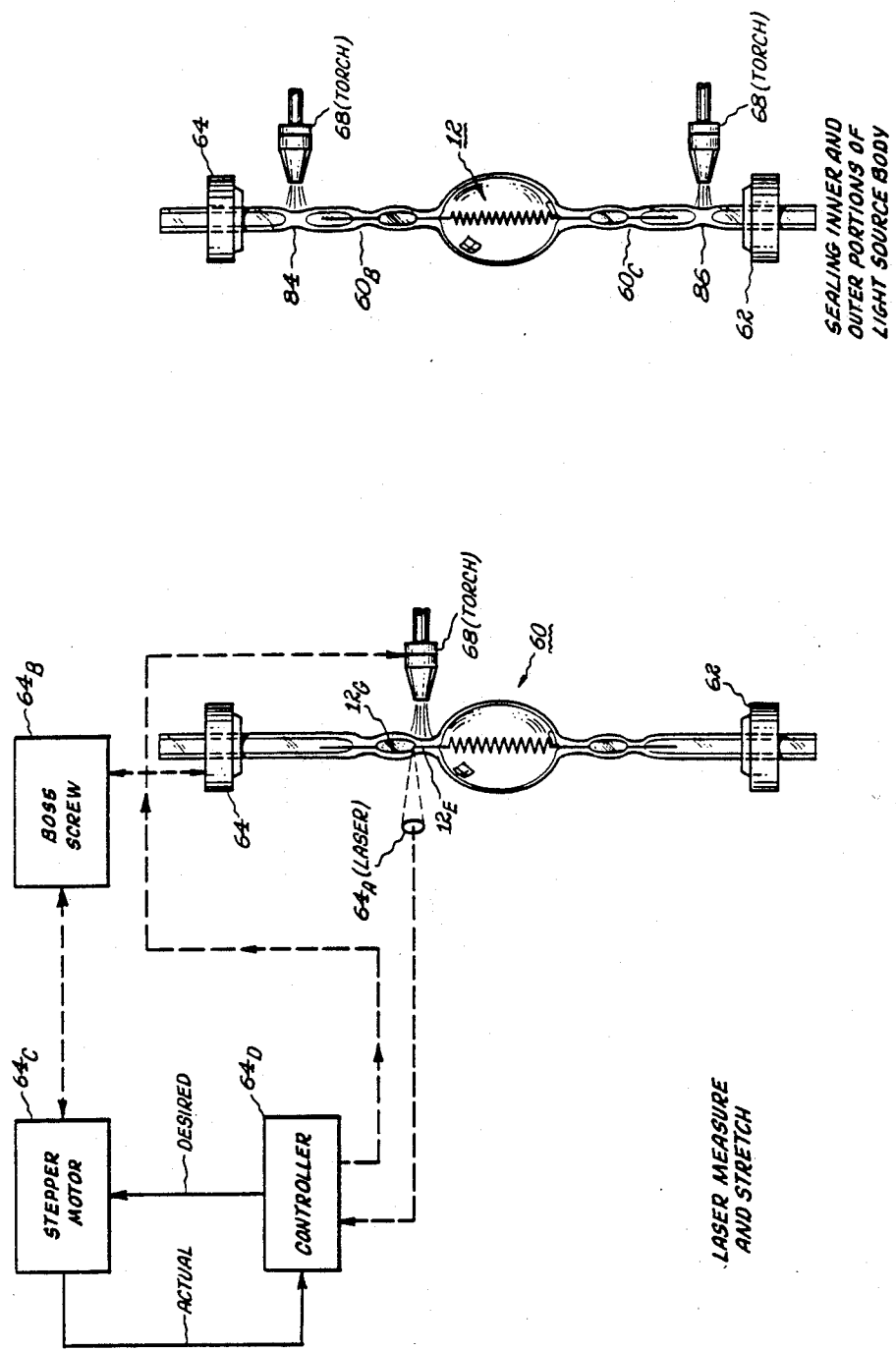
Fig. 2(k) SEALING INNER AND OUTER PORTIONS OF LIGHT SOURCE BODY
Fig. 2(j) LASER MEASURE AND STRETCH

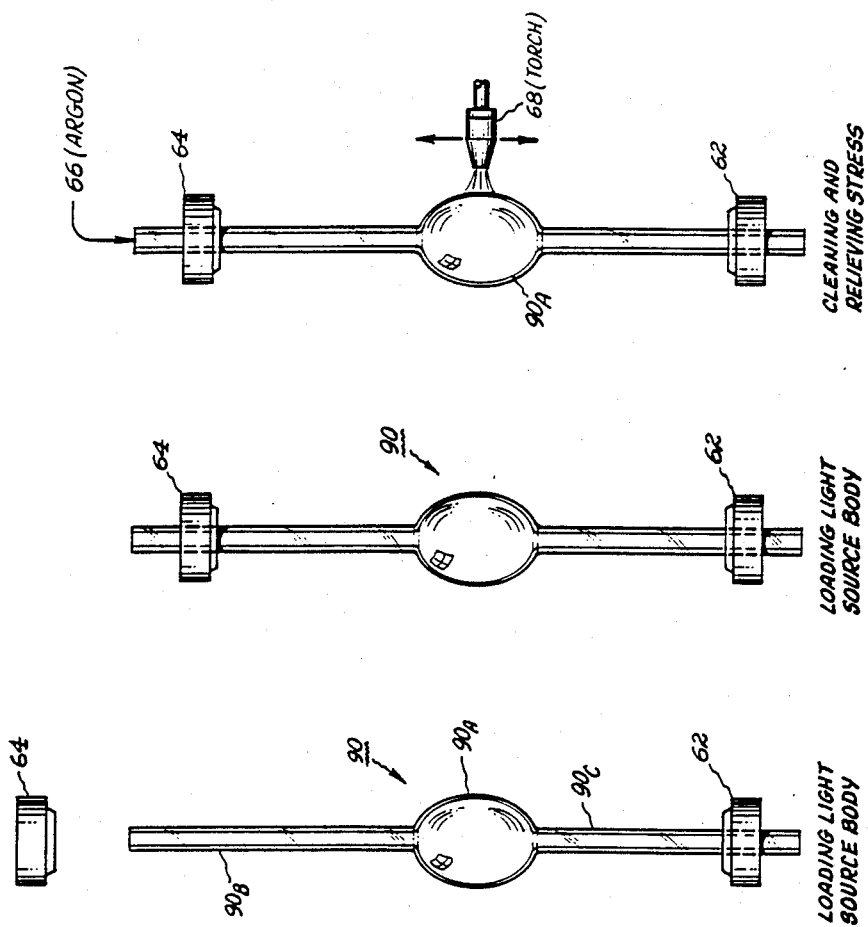
Fig. 3(c) CLEANING AND RELIEVING STRESS
Fig. 3(b) LOADING LIGHT SOURCE BODY
Fig. 3(a) LOADING LIGHT SOURCE BODY
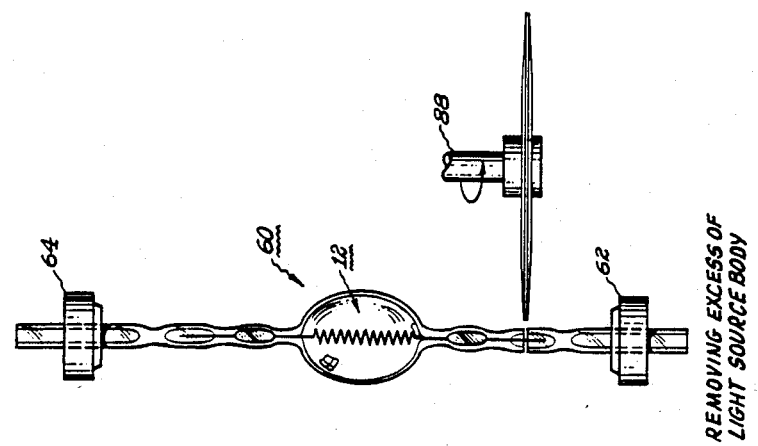
Fig. 2(l) REMOVING EXCESS OF LIGHT SOURCE BODY

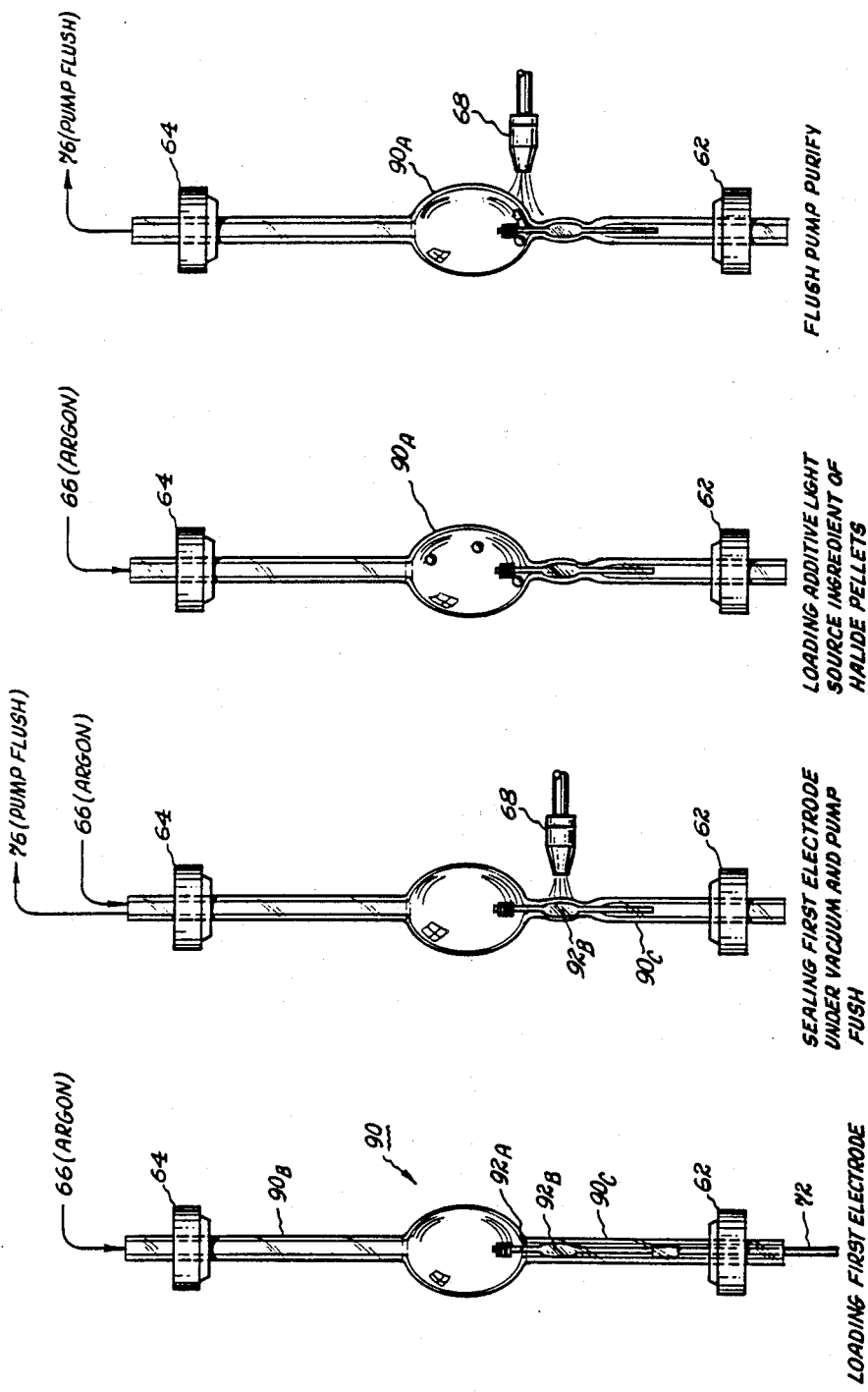

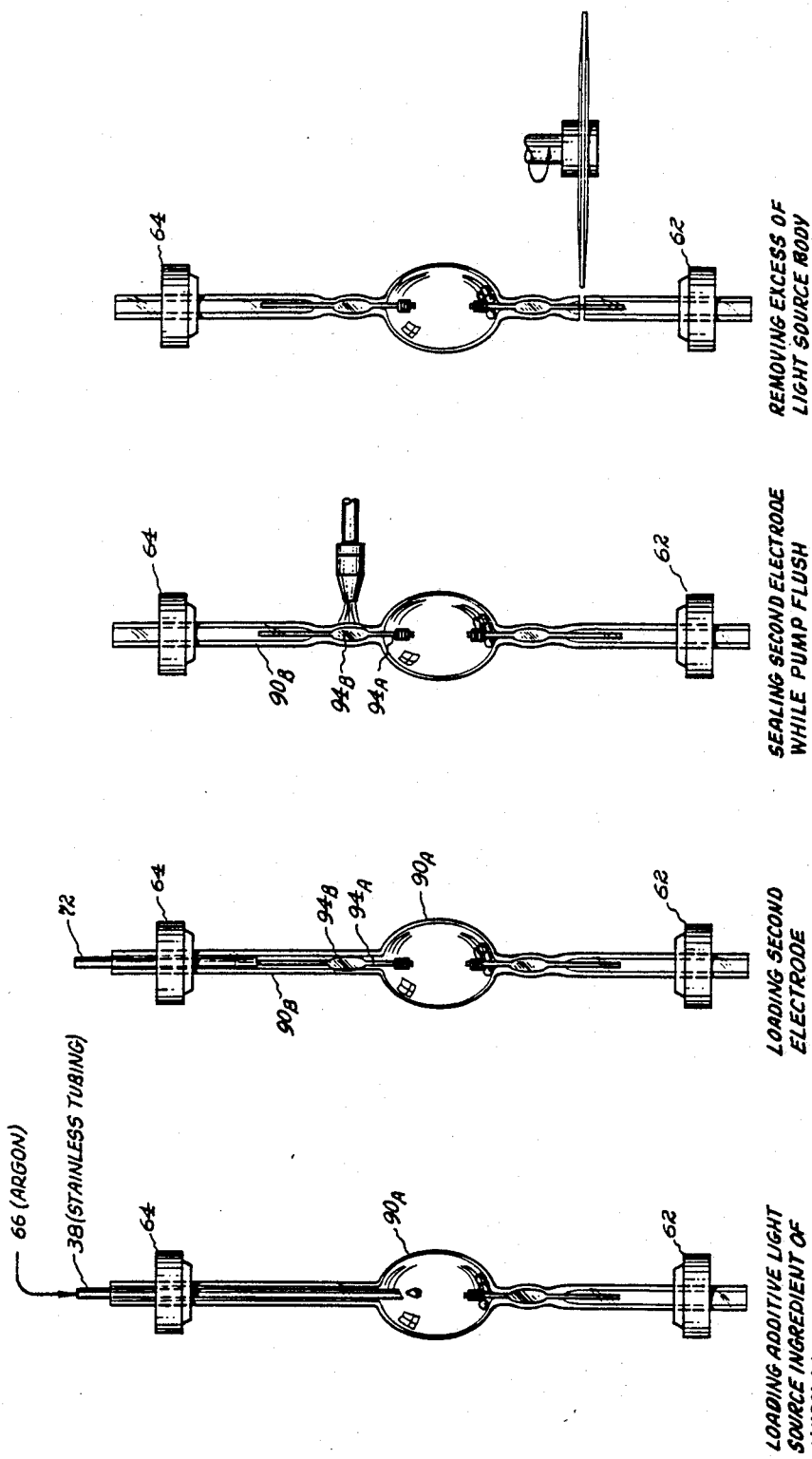

METAL VAPOR DISCHARGE LAMPS

This is a division, of application Ser. No. 798,646, filed Nov. 15, 1985, now Pat. No. 4810932.

CROSS REFERENCE TO RELATED APPLICATION

This invention is related to U.S. Patent Application Ser. No. 798,550 of E. G. Zubler and E. J. Covington filed concurrently herewith, and assigned to the same assignee as the present invention.

BACKGROUND OF THE INVENTION

This invention relates to processes for making double-ended tipless light sources for incandescent and metal vapor discharge lamps. The processes are particularly suited to be adapted to make light sources which comprise, in part, a reflective film completely covering the outer surfaces of the light sources.

A method of manufacturing a double-ended lamp particularly suitable for the utilization of the high pressure metal vapor discharge lamps is disclosed in U.S. Pat. No. 4,389,201 of Hansler and Fridrich, assigned to the same assignee as the present invention and herein incorporated by reference. U.S. Pat. No. 4,389,201 discloses a glass lathe machine and a related method in which the double-ended lamp is flushed continuously with a dry gas so as to prevent contamination of the lamp components. Further, U. S. Pat. No. 4,389,201 discloses a method of accurately positioning the electrodes of the discharge lamp. The method of manufacturing U.S. Pat. No. 4,389,201 while serving its desired functions for the high pressure metal vapor discharge lamps does not find application to incandescent lamps.

One of the embodiments of the present invention is related to a method of manufacturing tipless double-ended light sources for tungsten-halogen incandescent lamps having the benefits of U.S. Pat. No. 4,389,201. Further, the present invention provides light sources which simplify the mounting structures of related incandescent and metal vapor discharge lamps. Still further, the present invention provides various methods of allowing an infrared or visible reflective coating to be applied, by means such as dipping, to the light source without causing any detrimental reactions between the ingredient comprising the reflective coating and the electrical leads including the seal members of the light source. The light source may be advantageous shaped, such as ellipsoidal, so that the benefits of the reflective coating cooperating with the incandescent filament may be fully realized. The composition of the reflective coating may be selected so as to allow a desired portion, for example visible or infrared, of the spectrum of the electromagnetic energy developed by the filament to be transmitted out of the lamp, and also to allow a desired portion (visible or infrared) of the spectrum to be reflected by the coating back toward the filament so as to increase the operating temperature of the filament. Infrared reflective films may be used to increase the efficacy or lumens per watt of the light source. Visible reflective films may be used to advantageously increase the heat for lamps such as heat lamps. The reflective coating providing increases in efficacy finds applications in the typical incandescent lamps, heat lamps and stage and studio lamps having improved color rendition indices and color temperatures.

The present invention provides a shrink seal which avoids problems related to non-uniformity of the walls of the light source which may otherwise reduce the effectiveness of the reflective coating. Also, the shrink seal is formed without excessive heat that may otherwise damage the light source. The present invention further provides precise control of dimensions of the light source by utilizing molding techniques. The complete processing of various light sources of the present invention is accomplished without release of the tube forming the light source so that dimensional control of the light sources is maintained throughout the processes. In certain embodiments, the present invention utilizes a continuous flush process during the manufacturing of the lamps to substantially eliminate any build-up of the contaminants that may otherwise occur during the process of the lamp. In other embodiments, a pump flush technique is utilized which also eliminates build-up of contaminants involved with the light source fabrication.

SUMMARY OF THE INVENTION

The present invention is directed to methods of manufacturing which yield light sources for incandescent and metal vapor discharge lamps. One of the methods is a flush process which is characterized by continuously flushing the light sources so as to reduce contaminations otherwise occurring in its manufacturing process. In another method a pump flush technique is characterized by alternately filling the light source with an inert gas and then pumping it out which draws any contaminations out of the light source during its fabrication process. All of the methods of the present invention also yield light sources that are particularly suitable for allowing infrared or visible reflective coating to be applied to their surfaces. For such reflective coated light sources, the associated lamp leads and their respective seal members of the light source are all encased in the light source during the reflective film coating process and, therefore, are protected against any detrimental reaction of the lamp leads and seals that may otherwise be created by the interaction of ingredients used for the reflective coating. The light sources are particularly suited for use with infrared reflective coating because the light source may be shaped to most effectively reflect the infrared back to the filament. The light sources yielded by the methods of the present invention are advantageous in reducing the mounting arrangement of all the various lamps in which the related light sources are housed.

FLUSH PROCESS

In its first aspect, the invention resides in a flush process for manufacturing light sources for incandescent and metal vapor discharge lamps. The flush process is particularly suited for producing relatively small light sources. The flush method is characterized by a continuous flush of an inert gas such as argon which carries away and reduces any contaminates of the light source during its fabrication. The flush process comprises the steps of providing a transparent, hollow light source body having a mid-portion with a predetermined shape and first and second tubular neck portions. A filament assembly is further provided having a filament with predetermined voltage characteristics, a predetermined length and diameter, a first inlead having an extension and its other end connected to a seal member which is further connected to a first end of the filament The filament assembly has a second inlead having one end with an extension and its other end connected to a seal member which is further connected to the other side of the filament. The filament assembly is inserted into the light source body so that the filament occupies the mid-portion of the light source body and the first and second seal members partially occupy said first and second neck portions of said light source. The ends of the filament assembly are solely supported by the first and second seal members respectively occupying the first and second neck portions. The region of the first tubular neck portion related to its seal member is then heated so as to seal the seal member within the confines of the first tubular neck portion. The light source body is then loaded with a predetermined amount of an additive light source ingredient while simultaneously cooling the mid-portion of the light source body. If mercury is selected as an additive light source, sealing of the first seal member is not necessary before the mercury is loaded into the light source body because the mercury will stick to the wall of the mid-portion of the light source body. Heat is applied to the region of the second tubular neck portion related to its seal member so that the seal member is sealed within the confines of the second tubular neck portion. Excess portions of the first and second tubular neck portions may be removed so as to form the final light source or one of the ends may be used to mount the light source to the base of the lamp.

PUMP FLUSH PROCESS

In the second aspect, the invention provides a pump flush process for forming light sources for incandescent and metal vapor discharge lamps. The pump flush method is characterized by having a pressure differential established relative to the light source during the process of heating the light source so as to draw any contaminates out of the light source. The pump flush process comprises the steps of providing a hollow light source body having a mid-portion with a Predetermined shape and first and second tubular neck portions and a filament assembly. After heating the light source to clean it, the filament assembly is then inserted into the light source body. Heat is then applied to the tubular neck portion related to the first seal member so as to seal the first seal member within the confines of the first tubular neck portion. A predetermined amount of light source ingredient is then loaded into the mid-portion of the light source. Heat is then applied to the region of the second tubular neck portion related to the second seal member so as to seal the second member within the confines of the second tubular neck portion. Excess portions of the first and second tubular neck portions are removed so as to form the final light source.

FLUSH AND PUMP FLUSH PROCESSES PARTICULARLY SUITABLE FOR REFLECTIVE FILM DEPOSITION

In its third aspect, the flush and pump flush processes of the present invention provide light source for advantageous application of a reflective coating. In both the flush and pump flush processes before the excessive portions of the light source body are removed, a reflective film is deposited, by means such as dipping, onto the light source body. During such depositions of the reflective film, the electrical leads and their related seals are encased within the confines of the light source body and therefore are not susceptible to any detrimental reaction from the ingredients forming the deposited reflective film.

Further, the flush and pump flush processes of the present invention allow for such deposition after all the related steps involving heat are performed so that the reflective film deposited on the light source need not be further subjected to or degraded by the application of heat. More particularly, by avoidance of any further substantial heat such as that occurring during the sealing operation of the seal members of the light source which may overheat, degrade, and render the related reflective film inoperative, all of the deposited reflective film devoid of heat detriment cooperates in the beneficial operation of the light source.

LIGHT SOURCES YIELDED BY THE PROCESSES 0 THE PRESENT INVENTION

In its fourth aspect, the invention provides light sources for incandescent lamps comprising a tipless, double-ended tubular envelope having a portion housing a filament, and an additive light source ingredient. The envelope has a lower portion having a length which is substantially greater than the length of an upper portion of said envelope. By making the tubular portion beyond the seal at one end of the light source of a suitable length, this portion may be used to mount the light source to the base of the lamp. In another embodiment having a double-ended tubular envelope formed of glass, the seal members are not present and the filament is connected by rod-like first and second inleads. The first inlead of all embodiments for incandescent type lamps, has its second end extending out of the upper portion of the tubular envelope by a predetermined amount. The second inlead has its second end extending out of the lower portion of the tubular envelope by a predetermined amount. The present invention further preferably provides a light source wherein at least the filament containing portion of the tubular envelope has its outer surface covered with a reflective film. The filament containing portion may be suitably shaped, for example, into an ellipse of rotation so as to most effectively return the infrared radiation to the filament.

The invention also provides a light source for a vapor discharge lamp in which the filament is replaced by first and second electrodes located in opposite ends of a double-ended tubular envelope The light source for the discharge lamp may also have an upper portion, lodging the electrodes, of the double-ended tubular envelope with its outer surface covered with a multi-layer reflective film.

LAMPS YIELDED BY THE LIGHT SOURCES OF THE PRESENT INVENTION

In the fifth aspect, the present invention provides light sources which simplify the mounting arrangements of incandescent lamps.

Further, the present invention provides light sources for a lighting unit in which the filament is selected to have parameters that are particularly suitable for activation by a voltage less than 120 volts. Filaments operated at lower voltages use larger wire which can be operated hotter and therefore have higher efficacy for a prolonged certain life. The low voltage filament is accommodated by the lighting unit by providing a control circuit routing the excitation to such a filament and housed within the electrical conductive base of the lighting unit. The control circuit reduces the typical household power applied to the electrical conductive base and which reduced voltage is applied across the filament.

BRIEF DESCRIPTION OF THE DRAWING

FIGS. 1(a) through (p) illustrate the steps involved with the flush process of the present invention.

FIGS. 2(a)–(l) illustrate the steps involved with the pump flush process of the present invention.

FIGS. 3(a)–(k) illustrate the steps involved with the pump flush process of the present invention related to metal vapor discharge lamps.

DETAILED DESCRIPTION OF THE PREFERRED EMBODIMENTS

Figure 4:
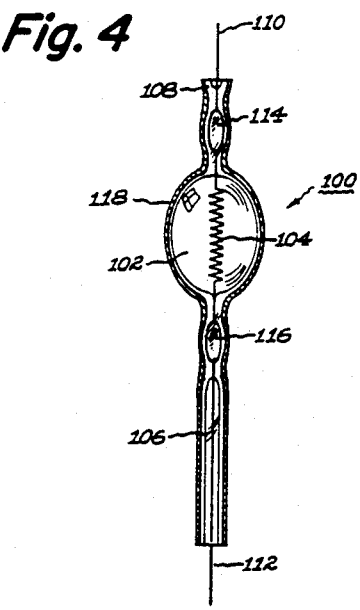
FIG. 4 illustrates one embodiment of the present invention of a light source developed by either of the flush or lump flush process of the present invention.

The practice of the present invention may be accomplished on a manufacturing machine similar to that described in U.S. Pat. No. 4,389,201 having a glass lathe construction. As described in U.S. Pat. No. 4,389,201, the glass lathe construction has a horizontal glass blowing lathe which may be used in the manufacture of the light sources of the present invention To enable high speed production of lamps, several identical lathes preferably are carried on and are spaced angularly around a rotary turntable or carousel adapted to be indexed intermittently and counterclockwise about a vertical axis so as to move each lathe through a series of stations where successive operations, to be described hereinafter, re performed to manufacturing the light sources of the present invention Each lathe is indexed to and dwells momentarily at twenty-one stations while the light source is being manufactured, the lathe being moved through such stations as a table of the glass manufacturing machine rotates through one-half revolution. To enable effective use of the stations, twenty-one lathes are spaced angularly around one-half of the table and thus one lathe dwells at each station each time the table is stopped. An additional twenty-one lathes may be spaced around the other half of the table and moved through twenty-one stations which are identical to the corresponding stations around the first half of the table. With such an arrangement, one light source is made when any given lathe is moved through one-half revolution by the table and then a second light source may be made on the same lathe when the latter is moved to an additional one-half revolution.

The manufacturing machine of U.S. Pat. No. 4,389,201 is particularly suited for being adapted to the flush process of the present invention. The flush process of the present invention may be described with reference to FIGS. 1(a) through (p). Although the horizontal flush process to be described makes reference to the formation of a single light source sequencing through the various work stations previously described, it should be recognized that the description to be given is applicable to simultaneous formation of a plurality of the light sources sequencing through the work stations.

For the embodiment shown in FIGS.1(a)–1(p) the flush process is initially provided with a hollow light source body 10 (shown in FIG. 1(a)) having a mid-portion $10_A$ and a first $10_B$ and a second $10_C$ tubular neck portions. Further, a filament assembly 12 (shown in FIG. 1(d)) is provided having a filament $12_A$ with predetermined voltage characteristics, a first inlead $12_B$ having one of its ends with attachment means shown as a hook-shape section $12_C$ and its other end connected to a first seal member $12_D$ which is further connected to the first end of the filament. A second inlead $12_E$ having one end with attachment means shown as a loop extension section $12_F$ and its other end connected to a second seal member $12_G$ which, in turn, is further connected to the other end of the filament.

As is to be discussed, the flush process is initially provided with the light source body and filament assembly. The flush process then sequences, in a manner to be described, to produce the final light source. This sequence may be provided with various alternates such as providing a light source body 10 having a mid-portion with a predetermined shape. As is to be described, due to one of the advantages of the shrink seal of the present invention, the light source body may be provided with an infrared or visible reflective coating covering its external surface before sealing. Also, the filament may be flashed in hydrogen with or without the presence of a magnetic field prior to its placement within the confines of the light source body. The light source body may be of a glass material allowing for a filament assembly not having seal members but rod-like inleads which approximately match the expansion coefficient of the glass. The seal members $12_D$ and $12_G$ for a light source preferably formed of quartz may be of a thin molybdenum foil with bent edges or other means so that the seal members abut against the inner walls of the light source body. The seal members $12_D$ and $12_G$ may be of the type described in U.S. Pat. No. 4,254,356 of Karikas, assigned to the same assignee as the present invention and herein incorporated by reference. One of the purposes of the seal member $12_D$ and $12_G$ is to maintain alignment of filament assembly during the formation of the light source.

The flush process is initially shown in FIG. 1(a). FIG. 1(a) shows the light source body 10 which has as a relatively heavy wall hollow tube having typical dimensions of 1.4 by 3.2 mm preferably being cut with a laser beam 14, while being held in a headstock 16 of a lathe, at an angle of about 30° from the axis of the light source body 10. This cutting preferably produces a point portion $10_D$ on one end and a funnel portion $10_E$. The point $10_D$ helps to guide the light source 10 into the chucks of the glass lathe. The funnel $10_E$ helps to guide the insertion of parts, to be described hereinafter, used during the formation of the light source of the present invention. The funnel and point portions of the light source body may also be provided by means other than laser cutting such as a glass blowing technique. For such a technique, the related neck portion is first heated, then stretched, then its inner surfaces blown outward and then cut by a torch so as to provide the desired funnel on the one end and contracted on the other end to provide the point portion.

The blowing technique and laser cutting of FIG. 1(a) may vaporize some of the quartz material of the light source body onto the inner surface of the light source body resulting in silica smoke deposition. The silica smoke deposition may be removed by washing the tubing, both its inner and outer surfaces, in hydrofluoric acid. This is a preferred step in the present invention since residual smoke deposits tend to be transferred or picked up onto the surface of the parts, used in the formation of the light source, when these parts are inserted into the light source 10. Removing the silica smoke deposits eliminates this source of silica contamination as well as any contamination absorbed by or associated with the silica smoke deposition, for example, water, oxygen, nitrogen and absorbed silicon.

After loading the light source body in the leadstock collet, gaseous impurities may be removed from a surface of the quartz tubing itself by heating the tubing while flushing the tube with pure argon. The light source body 10 is then preferably straightened in a manner as shown in FIG. 1 (c) to substantially remove any longitudinal curved portions thereof. The light source body 10 is grasped in headstock 16 and is straightened by heating, by means such as torch 20, a narrow zone next to the headstock 16 while supporting the free end of the light source body 10 with a flexible device, such as a finger arrangement 22 while preferably supplying a flush gas 24 through the confines of the light body.

The filament assembly 12 is now inserted into the first tubular neck portion being held by headstock 16 of the lathe. The filament assembly 12 is shown in FIG. 1(d) with the first inlead $12_B$ being first inserted and the loop extension $12_F$ being the only portion of the filament assembly to remain outside of the first neck portion. The filament assembly 12 is preferably inserted into the first neck portion or inboard end of the light source body 10 just far enough that both foils $12_D$ and $12_G$ are within the light source body. The ends of the filament assembly are solely supported by the first and second seal members abutting up against and respectively occupying the first and second neck portions. The light source body 10 is sufficiently long enough so that when the filament assembly 12 is in its position shown in FIG. 1(d), it is sufficiently removed from the mid-portion $10_A$ so as not to interfere with the formation of the mid-portion $10_A$ to be described. The filament assembly 12 is held in place within the light source body 10 by means of bent edges of the foils $12_D$ and $12_G$ which serve as springs to position and maintain the filament assembly 12 on the central axis of the light source body.

After step of FIG. 1(b), and continuing throughout the process, unless otherwise specified, an argon gas is forced to flow through the light source body 10, shown in FIG. 1(e) as a flush 24, by entering into the first neck portion $10_B$ (shown in FIG. 1(a)), then passing through mid-portion $10_A$ and finally out of the second neck portion $10_C$. The flowing argon gas acts so as to flush out any volatile impurities arising during the heating of the quartz light source body 10. This "through flushing" is an important feature during subsequent light source body 10 fabrication and is of significant importance to the present invention. The impurities are flushed out of one end and the fill gas is introduced through the other end so there is no opportunity for the impurities to get back into the light source body.

A preferred stress-relieving step of the present invention is shown in FIG. 1(e). The tailstock 18 is moved forward to grasp the second neck portion $10_C$ of the light source body 10 in its collet while the light source body 10 is heated in a narrow zone by torch 20 near but not touching the light source body 10 so as to relax any stresses in the light source body produced when the collet of the tailstock 18 is closed around the light source body 10. This relieving stress step avoids twisting motion of the light source body 10 during sealing steps, to be described, which would otherwise cause the filament assembly 12 to shift off the central axis of the light source body 10.

A preferred step of lighting the filament in hydrogen is shown in FIG. 1(f). The second or inboard inlead $12_F$ of the filament assembly 12 may be equipped with means 26, such as a hairpin or other conductive device, so as to make contact with the metal of the headstock 16. Electrical contact may be made to the second or outboard inner lead $12_B$ by means of an insulated probe 28 which engages the hook section $12_C$. During this step the flush gas 24 is changed from argon to an inert gas containing hydrogen and the filament assembly is excited by an appropriate power source, so as to be heated by the passage of current. This step in the process removes oxygen contamination from within the confines of the light source body 10 and crystallizes the filament itself. By applying direct current to the filament positioned so that magnetic forces counter balance the force of gravity on the filament, the crystal structure of the filament may be set so that filament sag is avoided.

The next step of the flush process is shown in FIG. 1(g) as a gathering step. In such a step, heat, by means of torch 20, is applied to the mid-portion $10_A$ of the light source body. The heat raises the temperature of the mid-portion $10_A$ to its softening condition. In order to produce the proper bulb wall thickness it is necessary to increase the amount of quartz material of the light source body at the mid-portion $10_A$ so as to form a bulbous shape. To accomplish this, the quartz tube is heated and the tailstock 18 is moved forward slightly so as to gather the increased quartz material at the mid-portion $10_A$. The movement of the tailstock is repeated as necessary in order to provide a relatively uniform thickness at the mid-portion $10_A$ of the light source body after the bulbous portion is formed.

The next step of the flush process is shown in FIG. 1(h) as molding of the mid-portion $10_A$ of the light source body 10 into a predetermined shape. This predetermined shape may be spherical, elliptical, tubular or any other desired type determined by the parameters of the various lamps to be described. The desired shape is obtained by the preselection of the inner shape of the mold 30.

The mid-portion $10_A$ is heated to its soften condition after which the mold 30 is brought around the light source body. Simultaneously, a plug 32 is mated into the second neck portion $10_C$ so as to essentially block against any escaped argon created by argon 34 (BLOW) being forced into the first neck portion $10_B$. The softened mid-portion $10_A$ is blown out against and takes the shape of the mold 30. Very precise control of the mid-portion $10_A$ dimensions is achieved by this molding process.

A preferred step performed after the molding is the heating of the mid-portion $10_A$ so as to clean its internal confines as shown in FIG. 1(i). After molding, the mid-portion $10_A$ including the neck portions $10_B$ and $10_C$ regions near the mid-portion $10_A$, are heated, by a torch arrangement 36, to drive out water and other impurities, while simultaneously the light source body is being flushed (24 flush) with a high purity argon gas. The water and oxygen levels in the argon gas are monitored continuously so these levels are typically only a few parts per million within the argon gas.

The next step of the present invention shown in FIG. 1(j) is related to loading a predetermined amount of an additive light source ingredient into the molded mid-portion $10_A$ of the light source body 10. The additive light source ingredient may be selected from the group consisting of (1) krypton and xenon along with a halogen additive selected from the group consisting of HBr, HI, $CH_3Br$, $CH_2Br_2$, $Br_2$ and $I_2$, (2) mercury and a halogen additive selected from the group consisting of HBr, HI, $CH_3Br$, $CH_2Br_2$, $Br_2$, $I_2$ along with the presence or absence of xenon, (3) mercury along with an inert gas selected from the group consisting of argon, nitrogen, krypton and xenon. The first selectable light source additive comprises krypton or xenon is in the range of about 300 to 16,000 torr at room temperature and the halogen additive in the range of about 0.005% to about 0.1% by weight. The second selectable light source additive comprises mercury in the range of about 1000 to 30,000 torr when vaporized, the halogen additive in the range of about 0.005% to about 0.1% by weight, and if xenon is present it is in the range of about 40 to about 600 torr at room temperature. The selectable light source additive containing mercury is further described in the cross-reference U.S. Patent Application Ser. No. 798,550 of Zubler and Covington to which reference may be made for further details.

If mercury pressurization is to be utilized for the particular light source of concern, the mercury may be provided by a mercury doser capable of dosing small amounts of mercury with high precision. Such a mercury doser may be that as described in U.S. Pat. No. 4,253,591 of Karikas, assigned to the same assignee as the present invention and herein incorporated by reference.

It is preferred that before a mercury dosage occurs the mid-portion $10_A$ be cooled to near room temperature so as to avoid vaporization of the mercury. In the illustration of FIG. 1(j), the tip of a stainless steel tube 38 having a teflon tube inside is positioned into the mid-portion $10_A$ and so that a mercury glob or dose is blown into mid-portion $10_A$. The doser 38 provides a mercury dose of about 3 mg with better than 0.5% (15 micrograms) repeatability in its usage. The halogen additive and inert gas related to the second and third selectable light source additive are placed into the light source body by freezing them using liquid nitrogen cooling.

The next step performed by the present process, shown in FIG. 1(k), is the positioning of the filament assembly 12 so that the filament $12_A$ occupies the mid-portion $10_A$ and the first $12_B$ and second $12_E$ inleads, respectively, partially occupy the second $10_C$ and first $10_B$ neck portions. To accomplish this, a stainless probe 42 equipped with a rotating hook is inserted into light source body 10, then moved so as to engage the hook section $12_C$, and finally the filament assembly 12 is pulled into its desired position within the mid-portion $10_A$. The probe is then disengaged from filament assembly 12 and retracted from the light source body.

After such retraction, a heating torch 20 is applied, as shown in FIG. 1(l), to region 44 of the neck portion $10_C$. In order to drop the pressure and create a pressure difference between the inside and outside of the light source body, e.g., between 50 and 750 torr, which is necessary to collapse the light source body during sealing, commonly termed "shrink sealing" to be described hereinafter with regard to FIGS. 1(m) and 1(n), the second neck portion $10_C$ beyond the end of the first inlead $12_B$ is tipped-off. By "tipping-off" it is meant that the quartz is heated until the tube is sealed. Before this tipping-off step, the flush gas is changed from an argon gas to a mixture of an inert gas plus a halogen gas.

The step of sealing the first neck portion $10_B$ is shown in FIG. 1(m). During such a step, a cooling source 48 is applied to the mid-portion $10_A$ of the light source body 10 while at the same time heat, by means of torch 20, is applied to the region 48 related to foil member $12_G$. Also, at the same time the pressure in the light source body 10 is reduced (typically 400 torr) by means of a vacuum pump. The cooling source 48 supplies a water mist which is directed onto the mid-portion $10_A$ so as to prevent heating of the mercury while the first neck portion $10_B$ is sealed onto the seal member $12_G$.

The manner in which the first neck portion $10_B$ is sealed onto foil member $12_G$ and also the manner in which the second neck portion is sealed onto seal member $12_D$ are herein termed "shrink sealing." If inert pressurization is to be used for the light source body 10, the mid-portion $10_A$ is chilled with liquid nitrogen so as to condense the inert gas and reduce the pressure well below atmosphere pressure.

An important advantage of the "shrink-seal" is that the seal may be formed around the seal members, such as molybdenum foils $12_D$ and $12_G$, without excessive heating of the quartz material which forms the light source body. This non-excessive heating is more fully realized if a significant pressure difference such as 50 to 500 torr exists between the inside and outside of the light source body 10. Without the "shrink-seal" method of the present invention, excessive heating of the light source body formed of a quartz material may otherwise produce a silica smoke deposition on the inner and outer surfaces of the light source body 10 which would be detrimental to the life of the light source body itself.

The step of sealing the second neck portion $10_C$ is shown in FIG. 1(n). The step illustrated in FIG. 1(n) is similar to that described with regard to FIG. 1(m).

After performance of the step illustrated in FIG. 1(n), the flush process of the present invention may sequence to either of the steps illustrated in FIG. 1(o) or in FIG. 1(p).

If the light source body 10 is to be coated with a reflective film by a suitable method such as dipping, it is advantageous to have the inner leads $12_B$ and $12_E$ along with seal members $12_D$ and $12_G$ sealed inside the light source body thereby allowing the entire light source body 10 to be dipped into the reflective film coating. Sealing both the inner leads $12_B$ and $12_E$ along with their associated elements within the confines of the light source body prevents the reflective film coating from degrading the electrical or mechanical characteristics of these components. Such benefits are realized in the step shown in FIG. 1(o) illustrating heat being applied to region 52 of the first neck portion $10_B$ so as to "tip-off" region 52 in a manner as described with regard to region 44 of FIG. 1(*l*). Simultaneously, the pressure is reduced inside of the light source by means of a vacuum pump.

If the light source body is not to have a reflective coating applied, the flush process may sequence from that described with regard to FIG. 1(*n*) to the step illustrated in FIG. 1(*p*). FIG. 1(*p*) illustrates the removal of excessive portions of the first and second tubular portions of the light source to form the final product. The extra portions of the light source body covering the outer leads may be removed by a scoring operation conveniently accomplished by means of applying a small diamond cut-off wheel, while the light source body is held by a lathe, to region 54 of the second neck portion $10_C$ and to region 56 of the first neck portion $10_B$ and then the excessive portion of the light source body is snapped-off. For the light source body described with regard to FIG. 1(*o*) having a reflective film applied, the scoring operation to snap-off the excessive portions of the light source body is not accomplished until after the dip coating treatment for the reflective film is performed. For light source used in incandescent lamps to be described hereinafter, one end of the light source body is intentionally left longer than the other end and serves as a mounting support.

The hereinbefore given description of the flush process of the present invention by use of a "shrink seal" method eliminates any tip-off section in the mid-portion of the light source body. The "shrink seal" method also avoids the otherwise created problems of non-uniformity of the wall of the mid-portion of the light source which reduce the effectiveness of any reflective coating applied. The flush process of the present invention may also form the bulbous mid-portion of the light source body by using molding techniques that provide such a light source having accurate and repeatable dimensions. All of the formational steps performed on the light source are accomplished without release of the light source body from the manufacturing machine thereby allowing accurate control of the dimensions of the light source. The flush process provides control to reduce any contaminations that may otherwise detrimentally affect the light source body. In the present invention any contamination is carried out of the confines of the light source body. Still further, the flush process of the present invention provides simplicity by integrating the operations of forming the light source body onto one rotary table. All of the handling and transfer from one machine to another are thus avoided. The simplicity is amenable for high speed and lower cost manufacturing of such a light source body.

PUMP FLUSH PROCESS RELATED TO INCANDESCENT TYPE LAMPS

The pump flush process of the present invention related to providing light source having any shape desired for incandescent lamps is illustrated in FIGS. 2(*a*) to 2(*l*). One of the many advantages of the vertical pump flush process of the present invention related to tungsten-halogen lamps, is that the filament assembly along with any related filament support member may be assisted into their desired position within the light source body by a vertical orientation of the process. The machine assembly which may be used to practice the present invention process is computerized controlled and sequences the operation of pump flush processes in a predetermined and prescribed manner. Some of the advantages of this prescribed manner are to be described hereinafter. The flush process may be practiced on a universal fixture having headstock and tailstock collets. As discussed with regard to the flush process of the present invention, the pump flush process is applicable to the sequential formation of a plurality of light sources.

The pump flush process, to be described hereinafter in more detail, pumps or creates a vacuum at one end of a light source body being formed during the formation process when heat is being applied to the light source body. The pump flush process alternately evacuates and fills the light source body so as to remove impurities from the confines of the light source body being formed. The pump flush process removes the contaminates that may have been released from the surface by the application of heat.

In a similar manner as described for the flush process, the pump flush process is first provided with a hollow light source body 60 (shown in FIG. 2(*a*)) and a filament assembly 12 (shown in FIG. 2(*d*)). The hollow light source body 60 has a mid-portion $60_A$ with a predetermined shape and first $60_B$ and second $60_C$ tubular neck portions. The hollow light source body 60 may also be of a complete tubular shape not having the mid-portion shape $60_A$ shown in FIG. 2(*a*). The filament assembly 12 is similar to that previously described with regard to FIG. 1(*d*) of the flush process with the exception of not having hooked-shape section $12_C$ and loop extension section $12_F$.

The light source body 60 having a predetermined shape at its mid-portion $60_A$ is first loaded and locked into a headstock collet 62 as shown in FIG. 2(*a*). The tailstock 64 is then closed as shown in FIG. 2(*b*) so as to accomplish loading of the light source body.

The light source body 60 is then preferably cleaned and stress relieved as shown in FIG. 2(*c*) by applying a torch 68 to the mid-portion $60_A$ while at the same time an argon gas 66 is routed into the first neck portion $60_B$.

The filament assembly 12 is then inserted into the light source body as shown in FIG. 2(*d*). The filament assembly 12 is inserted so that the filament $12_A$ occupies the mid-portion $60_A$ of the light source body 60, and the first $12_B$ and second $12_E$ inleads, respectively, partially occupies the second $60_C$ and first $60_B$ neck portions on the light source body. The ends of filament assembly 12 are solely supported by the first $12_D$ and second $12_G$ seal members abutting up against and respectively occupying the first and second neck portions. The filament assembly is positioned into the light source body by means of rods 72 and 74 located at opposite ends of the light source body so as to obtain the desired position of the filament assembly.

The filament is then preferably lit in the presence of hydrogen which may be supplied to the confines of the light source body by means of a flush gas comprised of 15% hydrogen and 85% argon. To accomplish such lighting, as shown in FIG. 2(*e*), a potential is supplied across the filament by means of rods 72 and 74. The lighting of the filament in hydrogen with or without the magnetic field reduces the sagging of the filament in a manner similar to that previously described with regard to FIG.1(*f*). Upon the completion of the lighting of the filament rods 72 and 74 are retracted and orientation of the filament assembly is primarily maintained by the foil members $12_D$ and $12_G$. In some cases, maintaining the orientation of the filament assembly may be assisted by support members related to the filament assembly.

Heat is then applied, by means of torch 68 as illustrated in FIG. 2(*f*), to the region of the tubular neck portion $60_C$ related to the seal member $12_D$ so as to seal the first seal member $12_D$ within the confines of the first tubular neck portion $60_C$. At the same time an argon gas 66 is routed into the first neck portion $60_B$. After the heat is discontinued, six (6) pump flush 76 cycles, each having a duration of about 0.5 seconds, are performed.

Each pump flush cycle comprises establishing a positive pressure differential between the inner confines of the upper or first neck portion $60_B$ and the inner confines of the lower or second neck portion $60_C$. The pressure differential is established, at the entrances of the neck portions of the light source body, by valves located at opposite ends of the machine holding the light source body. The valves eliminate the need of performing any sealing operation of the neck portions so that the pressure within the confines of the light source body may be reduced. The pressure differential places the neck portions $60_B$ at about 3 to 10 psi while the neck portion $60_C$ is placed at about 27 inches of mercury. The pump flush cycle operates so that any contaminates that may exist within the inner confines of the light source body are drawn out thereof so as to keep the purity of the light source body at a high level.

The mid-portion $60_A$ is then loaded with an additive light source ingredient as illustrated in FIG. 2(g). The additive light source ingredient may be either of first, second or third selectable additive previously described with regard to FIG. 1(j). Similarly, the method of placing the additive into the mid-portion $60_A$ of FIG. 2(g) may be that method described with regard to FIG. 1(j). For the portion of the method related to the selectable light source ingredient of mercury, loaded under the presence of an argon flow, as shown in FIG. 2(g), the stainless tube 38 is positioned into the light source body so as not to contact the seal member $12_G$ shown in phantom. It is also preferred that before a mercury dose is added, the mid-portion of the light source body be cooled by means such as cooling vaporization 78 of the mercury.

For the method illustrated in in FIG. 2(h) related to the addition of the first selectable light source ingredient described with regard to FIG. 1(j), a liquid nitrogen cooling 78 is applied to the mid-portion $60_A$, while at the same time the additive light source of halogen, krypton and/or xenon gas 80 gas is routed into the light source body 60 by way of the first neck portion $60_B$. The liquid nitrogen cooling is used to condense the halogen, krypton and/or xenon, within the mid-portion $60_A$ of the light source body 60.

Heat is then applied by means of a torch, as illustrated in FIG. 2(i), to a region 82 of the second tubular neck portion $60_B$ related to the second seal member $12_G$ so as to seal the second seal member $12_G$ within the confines of the second tubular neck portion $60_B$.

The next step preferably performed in either the pump flush process or flush process is a laser measure and if necessary the stretching of the filament. The determination of the need of filament stretching, is accomplished by a control mechanism illustrated in FIG.2 (j). The measuring and stretching step may be accomplished by an arrangement comprising, (1) means such as laser $64_A$ for detecting the location of inner lead $12_E$ and more particularly the seal number $12_G$, (2) means such as a boss screw $64_B$ for controlling the upward and downward position of the tailstock 64, (3) means such as an electrical stepper motor 64 for controlling the movement of the boss screw $64_B$ and further having means for supplying the actual position of the boss screw $64_B$ to a controller $64_D$ and recognizing the desired position developed by the controller $64_D$, and (4) a controller $64_D$ for interfacing with and controlling the stepper motor $64_C$, sensing the detection means of the laser $64_A$ and controlling the operation of the torch 68.

In general, during the operation of the arrangement shown in FIG.2(j), a program operating in the controller $64_D$ sequentially; (1) allows activation of laser $64_A$ which senses for position of inner lead $12_E$ and if it detects that the foil member $12_G$ is below its desired location, notifies the controller $64_D$ of such detection and further if no such detection is sensed by the laser $64_A$ then the controller $64_D$ determines that the filament need not be stretched; (2) if the below desired position of the foil member $12_C$ is detected, the controller $64_D$ then activates the torch 68 which then pre-heats the region near the foil member $12_G$ for a predetermined period such as 2.8 seconds; (3) the controller $64_D$ then notifies the stepper motor $64_C$ to move the screw boss in a desired manner so that the tailstock 64 is moved in an upward manner, which, in turn causes the filament to stretch; (4) the controller then, monitors the actual position of the tailstock 64, derived by means related to the stepper motor $64_C$, compares the actual position to the desired position predetermined by the operation of the controller $64_D$, and when the actual position is essentially the same as the desired position, the controller $64_D$ determined that the filament has been stretched in a predetermined manner; and finally (5) the controller then allows the pump flush process to sequence to its next predetermined programmed operating routine.

At this juncture in the sequence and in a manner as described with regard to the flush process, if the light source body 60 is to have a reflective film placed onto its surface, it is advantageous to have the inleads sealed within the confines of the light source body so that the entire light source body may be, for example, dipped into a reflective film coating and thereby the composition forming the reflective film will not detrimentally affect the electrical or mechanical properties of the inner leads and the related seal members. Such advantageous sealing of the inlead within the light source body is illustrated in FIG. 2(k) with torch being sequentially applied to regions 84 and 86 of tubular neck portions $60_B$ and $60_C$, respectively.

The final step of the sequence is illustrated in FIG. 2(l) showing a diamond type cutter 88 which is applied to the desired portions of the first and second neck portion so as to remove the excess portions and form the light source 60.

PUMP FLUSH PROCESS RELATED TO MERCURY VAPOR DISCHARGE LAMPS

The pump flush process of the present invention related to mercury vapor discharge lamps is illustrated in FIGS. 3(a) to 3(k). The vertical pump flush process related to mercury discharge lamps is similar to the previously described flush process for incandescent type lamps except that electrodes are employed in lieu of an incandescent filament. The description to be given for the pump flush process for the mercury vapor lamps refers to certain reference numbers previously described with regard to the pump flush process for incandescent type lamps. The vertical pump flush process for mercury vapor discharge lamps is shown, in part in FIGS. 3 (a), (b), and (c) related to light source body 90, which are respectively similar to the descriptions previously given with regard to FIGS. 2(a), (b) and (c) related to light source body 60.

The first electrode $92_A$ for the mercury vapor discharge lamp is placed into the lower or second neck portion $90_C$ by means of a rod 72 as illustrated in FIG. 3(d). At the same time electrode $92_A$ is inserted, an argon gas 66 is routed into the upper or first neck portion $90_B$. The first electrode $92_A$ is connected to seal member $92_B$ which maintains the orientation of the electrode $92_A$ after the rod 72 is removed from the light source body 90. The seal member $92_B$ may be of the type described in U.S. Pat. No. 4,254,356 of Karikas, assigned to the same assignee as the present invention and herein incorporated by reference.

The first electrode, in particular, seal member $92_B$, as illustrated in FIG. 3 (e), is sealed in a manner as previously described with regard to FIG. 2(e) with the exception that the first electrode is sealed under argon having a typical pressure of 120 torr.

The mid-portion $90_A$ is then loaded with an additive light source ingredient of hydroscopic halide pellets in the presence of an argon flow 66 as shown in FIG. 3(f). The method and apparatus for handling and dispensing th hydroscopic halide pellets may be as described in U.S. Pat. No. 4,267,943 of Karikas, assigned to the same assignee as the present invention, and herein incorporated by reference.

The halide pellets are then purified in a manner shown in FIG. 3(g). For such purification, a three (3) second pump flush 76 is accomplished along with a 0.4 second cycle of heating of the mid-portion $90_A$ with an oxygen-hydrogen torch 68.

The mid-portion $90_A$ is then loaded with an additive light source ingredient of mercury by means of stainless tubing 38 and in the presence of an argon flow as shown in FIG. 3(h). The loading of mercury may be accomplished in a manner similar to that described with regard to FIGS. 1(j) and 2(g).

A second electrode $94_A$ attached to a seal member $94_B$ respectively similar to first electrode $92_A$ and seal member $92_B$ is loaded in the first neck section $90_B$ by means of rod member 72 as shown in FIG. 3(i).

The second electrode, in particular, seal member $94_B$, is then sealed, as shown in FIG. 3(j), in a manner similar to that described wit regard to FIG. 3(e). In a manner similar to the pump flush process related to incandescent lamps, at this juncture the light source body may be removed if desired to have a reflective coating applied or the described sequence may proceed to the step illustrated in FIG. 3(k) which is similar to that described with regard to FIG. 2(j).

FORMATION OF ALTERNATIVE LIGHT SOURCE BODY YIELDED BY THE FLUSH AND PUMP FLUSH PROCESSES ALONG WITH THE REFLECTIVE COATING PROCESS

Although the flush and pump flush processes each had an embodiment which described the formation of a light source body having a filament located within a spherical shaped mid-portion of the light source body, the practice of this invention is related to other shapes of the mid-portion of the light source body. For the embodiment of flush process of the present invention related to incandescent type lamps, to obtain a mid-portion body having shapes other than spherical, the mold 30, described with regard to FIG. 1(h), may be provided with internal surfaces having other desired shapes comprising ellipsis of rotation and cylindrical. The desired shaped of the mid-portion may also be accomplished by initially providing to the flush process a light source body having a desired shape. Similarly, the pump flush process of the present invention may be modified so as to obtain any desired shape by providing such a desired shape in the initially provided mid-portion of the light source body.

LIGHT SOURCES YIELDED BY THE FLUSH AND PUMP FLUSH PROCESSES ALONG WITH THE REFLECTIVE COATING PROCESS

The flush and pump flush processes of the present invention provide double-ended type light sources having a tipless construction. One such double-ended light source is shown in FIG. 4.

FIG. 4 illustrates a light source 100 finding usage in various incandescent type lamps. The light source 100 comprises a double-ended tubular envelope having a portion 102 housing a filament 104, along with the additive light source ingredient previously described with regard to the flush and pump flush processes. The light source 100 has a lower portion 106, particularly suitable for easing the mounting arrangement with lamps to be described, which is substantially longer than an upper portion 108 of the light source 100. The filament 104 is connected between the first end of each of a first 110 and second 112 inleads, respectively, by first 114 and second 116 seal members sealed in opposite ends of the double-ended tubular envelope. The first inlead 110 has its second end extending out of the upper portion of the tubular envelope by a predetermined amount determined by mounting conditions within the incandescent type lamp in which it may be housed. The second inlead 112 has a second end extending out of the lower portion of the tubular envelope by a predetermined amount determined by the connection conditions within the incandescent type lamp in which it is housed.

The light source 100 of FIG. 4 may have its filament 104 with parameters selected so as to be particularly suitable for activation by a voltage of 120 volts or greater such as 250 volts, or conversely, by a voltage less than 120 volts. The light source 100 may have a reflective film 118 covering the outer surface of at least the upper portion housing the filament of the double-ended tubular envelope 100, more particularly housing 102.

The light source 100 may have its double-ended tubular envelope formed of a glass material so as to eliminate the need of the first and second seal members 114 and 116 sealed in the opposite ends of the double-ended tubular envelope. For such an embodiment (not shown), rod-like conductors having an expansion coefficient which substantially matches that of the glass which extend through the tubular envelope and have respective direct connections to the filament 104.

Figure 5:
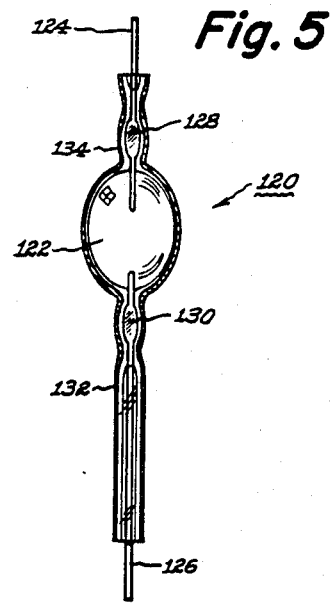
FIG. 5 illustrates another embodiment of the light sources yielded by th flush and pump flush processes of the present invention.

A light source 120 suitable for a vapor discharge lamp is illustrated in FIG. 5. The light source 120 has a portion 122 housing a first 124 and a second 126 electrode located at opposite ends of the tubular envelope. The first electrode 124 preferably has its portions interconnected by means of a seal member 128 located within one of the neck portions of light source 120, while the second electrode 126 preferably has its portions interconnected by means of a seal member 130 located in the other neck portion of the light source 120. The housing 122 further contains an additive light source ingredient described with regard to FIGS. 3(f) and 3(g). The light source 120 has a lower portion 132 with a length which is substantially greater than the length of an upper portion 134 of the light source 120. The first electrode 124 extends out of the upper portion 134 of the tubular envelope by a predetermined amount determined by the mounting arrangement of the vapor discharge lamp in which it is housed. The second electrode 126 extends out a lower portion 132 of the tubular envelope also by a predetermined amount determined by the mounting arrangement of the vapor discharge lamp in which it is housed.

The light source 120 for a discharge lamp may have a reflective film 136, shown in cross-hatched, covering at least the upper portion housing the electrodes 124 and 126 of the double-ended tubular envelope, in particular, the housing 122.

The light source 120 may also have an embodiment (not shown) in which the first and second electrodes are rod elements extending directly into the housing 122 without the need of any seal members.

LAMPS YIELDED BY THE PRACTICE OF THE INVENTION

Figure 6:
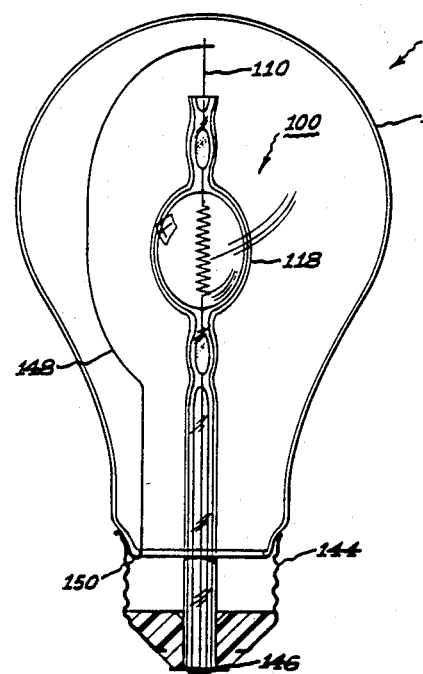
FIG. 6 illustrates an incandescent lamp in accordance with one embodiment of the present invention.

An incandescent lamp 140 in which the light source 100 may be mounted is illustrated in FIG. 6. The incandescent lamp 140 has an outer envelope 142 having the typical pear shape for general service incandescent lamps and an electrically conductive base 144 having a screw-in portion connected to the outer envelope 142. The outer envelope 142 need not be sealed to the conductive base 144 in that the light source 100 has its filament lodged within its housing negating the need of having any fill-gas within the confines of the outer envelope that would otherwise require the hermetic seal of the outer envelope. The light source 100 is affixed to a central portion 146 of the electrically conductive base by appropriate adhesive such as epoxy. The light source 100 has its first inlead 110 appropriately connected by means such as wire 148 to the shell portion of the electrically conductive base 144 at location 150. The second inlead 112 is appropriately connected to the tip islet portion 152 of the electrically conductive base 144.

The light source 100 may have the reflective film 118 covering at least the outer surface of the upper portion of the light source 100. The reflective film may be of an infrared type which reflects the infrared electromagnetic energy emitted by the filament back toward the filament, increasing the operating temperature of the filament without any further increases in the power level applied to the filament, and thereby increasing the efficacy of the lamp 140 itself.

The light source 100 may have its filament 114 selected so as to have parameters that are particularly suitable for activation by a voltage less than 120 volts. Such lower voltage filament is comprised of a wire size and wire length that increases the mechanical stability of the filament, relative to a filament selected to be activated by 120 volts and increases the expected life of the lamp 140.

The light source 100 provides a lamp 140 having a reduced or simplified mounting arrangement. More particularly, the lamp 140 has the double-ended light source 100 affixed within its confines without the need of any glass stem or any other members which are typically utilized to support and dispose a typical incandescent filament within an outer envelope.

Figure 7:
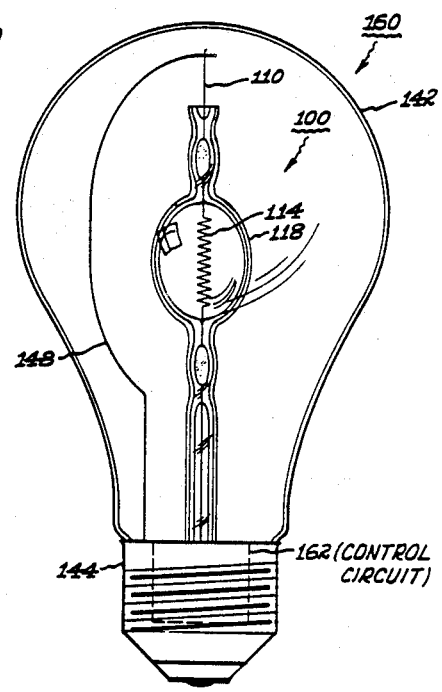
FIG. 7 illustrates a lighting unit in accordance with another embodiment of the present invention.

A lighting unit 160 which is adapted to advantageously cooperate with a low voltage type filament is illustrated in FIG. 7. The lighting unit 160 is similar to the previously described incandescent lamp 140 except that a control circuit 162 is housed within the electrically conductive base 144. The control circuit 162 reduces the typical household alternating current (A.C.) power source (120 volts at 60 Hz.) applied to the electrically conductive base 144. The control circuit 162 reduces the typical 120 volts alternating current to an a.c. or d.c. value in the range of 20 to less than 120 volts, but preferably from about 20 to 40 volts. This reduced voltage is then applied across the filament 114. If desired, a diode may be serially arranged with the filament so as to reduce the effective voltage applied across the filament to about 84 volts RMS. The control circuit 162 may be of the voltage reducing means type described in U.S. Pat. No. 4,547,704 of Brinn et al, assigned to the same assignee as the present invention and herein incorporated by reference.

Figure 8:
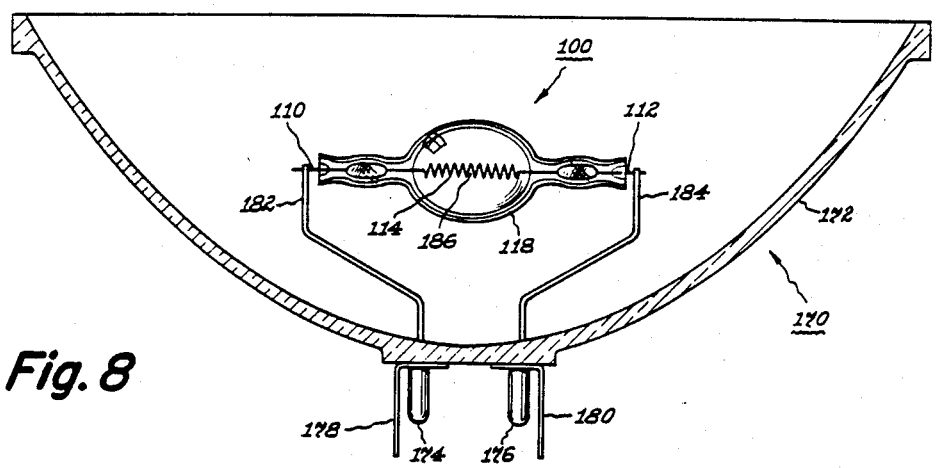
FIG. 8 illustrates a sealed beam headlamp unit in accordance with a further embodiment of the present invention.

A sealed beam headlamp unit 170 utilizing the light source 100 is shown in FIG. 8. The sealed beam headlamp unit 170 has a reflector 172 and a pair of ferrules 174 and 176 located at the base of the reflector. The ferrules 174 and 176 are respectively connected to a pair of electrical terminals 178 and 180. The filament 114 of the light source 100 is connected across the pair of ferrules by first 182 and second 184 electrical support members. The filament 114 has its central portion 186 located approximately at the focal point of the reflector 172 of the headlamp unit 170 and has parameters selected in accordance with the excitation available in the device, such as an automobile, in which it is housed.

As previously discussed, the light source 100 may have the reflective film 118 completely covering its outer surface and which is devoid of any film degrading applications of heat such as occurring during the sealing process so that all the reflective film cooperates in the operation of the light source 100 to enhance the efficacy of the headlamp unit 170.

Figure 9:
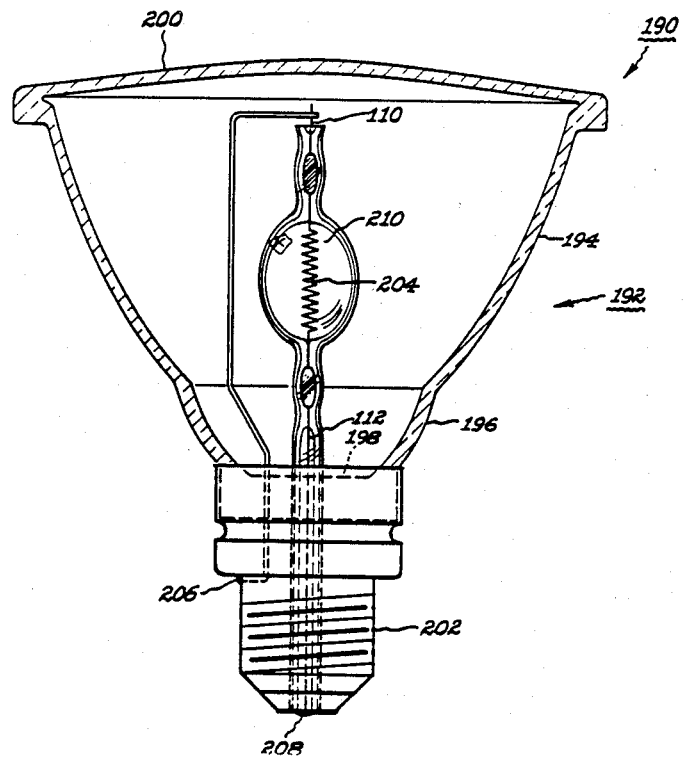
FIG. 9 illustrates a parabolic aluminized reflector (PAR) lamp in accordance with still another embodiment of the present invention.

A parabolic aluminized reflector lamp finding applications in spot lighting and flood lighting and utilizing a light source 100 is illustrated in FIG. 9. The PAR lamp 190 has a reflector 192 comprising a parabolic shaped section 194 preferably having its inner surface covered with a reflective material. The reflector 192 further has a spherical shaped intermediate section 196 also preferably covered with a reflective material on its inner surface. Still further, the reflector 192 has a parabolic rear section 198 also preferably having a reflective material on its inner surface. The lamp 190 has a lens 200 sealed to the upper portion of the front section of the reflector 192. The lamp 190 has an electrically conductive base 202 connected to the lower portion of the reflector and having a screw-in portion.

The light source 100 is affixed to the central portion of the electrically conductive base 202 by appropriate adhesive material such as epoxy. The filament 114 of the light source 100 has its central portion 204 approximately located at the focal point of the reflector 192. The light source 100 has its first inlead appropriately connected to a side portion 206 of the electrically conductive base of the reflector 192. Similarly, the light source 100 has a second inlead 112 appropriately connected to the tip portion 208 of the electrically conductive base of the lamp 190. The light source 100 is shown in FIG. 7 as having a circular shape for its mid-portion 210. In a manner previously described with regard to FIG. 3, the PAR lamp 190 by having the light source affixed at its central position has a simplified mounting arrangement relative to prior art PAR devices.

Figure 10:
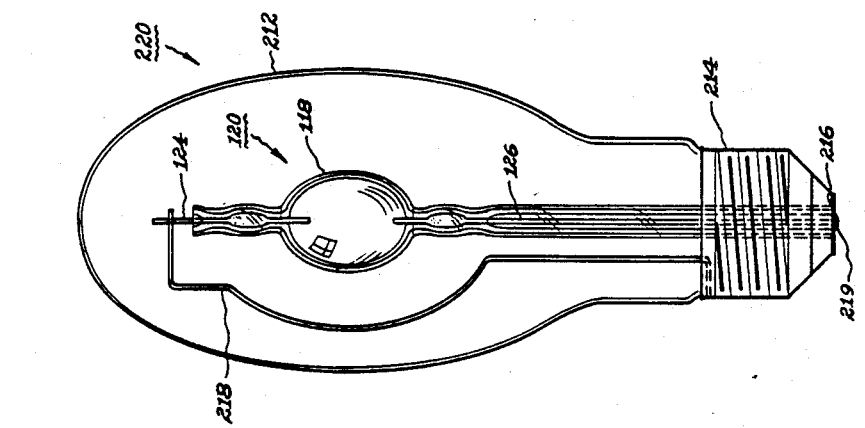
FIG 10 illustrates a high intensity discharge lamp in accordance with a further embodiment of the present invention.

A vapor discharge lamp 220 having mounted within its confines the light source 120 is illustrated in FIG. 10. The vapor discharge lamp 220 has an outer envelope 212 and an electrically conductive base 214. The light source 120 is affixed to the central portion 216 of the electrically conductive base 214 by means of an appropriate adhesive. The light source 120 has its first electrode 124 connected to a side portion electrically conductive base 214 by means of a first relatively thick conductor 218. The second electrode 126 of light source 120 is connected to the tip portion 220 of the electrically conductive base 214.

The light source 120 is affixed within the confines of lamp 220 with a limited number, in particular one (1), conductive member 218 so as to provide a simplified mounting structure for lamp 220.

Although the light source 120 is illustrated as being lodged within a cylindrical outer envelope 212, it should be recognized that the light source 120 finds usage in other types of vapor discharge lamps such as those having multi-faceted reflectors finding application in the high intensity photographic, stage and studio applications.

Figure 13:
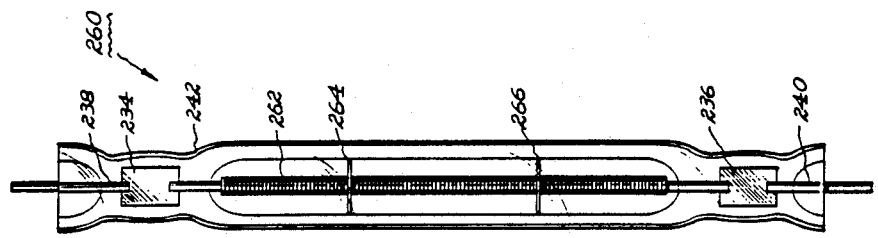
FIGS. 11, 12, and 13 illustrate various quartzline lamp embodiments of the present invention.
Figure 12:
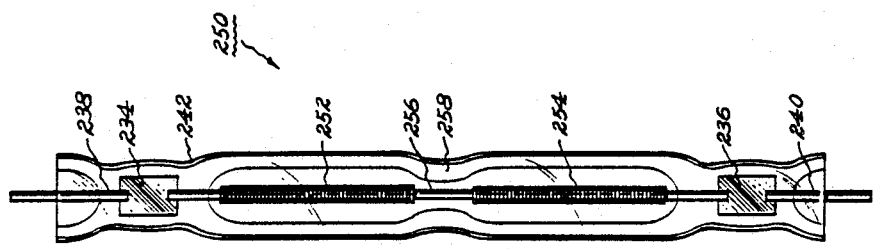
Figure 11:
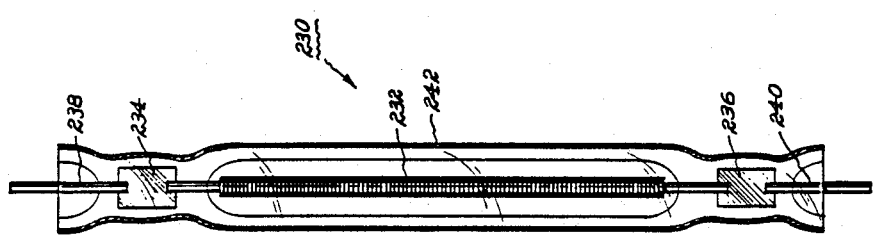

Further lamps contemplated by the practice of the present invention and finding use in the industrial, commercial and stage and studio applications are shown in FIGS. 11, 12, and 13.

FIG. 11 illustrates a tungsten-halogen heating lamp 230 which is preferably provided by the pump flush process of the present invention in that this process having a desired vertical inclination allows for a relatively heavy filament 232 to be accurately positioned within the confines of the lamp. Further, the pump flush process and also the flush process, by means of shrink sealing, eliminate the need of pinch sealing which would otherwise cause an indentation at locations related to seal members 234 and 236. The seal members have bent edges which maintain the orientation of the filament during the formation of lamp 230.

As discussed with regard to both the pump flush and flush processes of the present invention, seal members 234 and 236, along with their respective electrical inleads 238 and 240, may be encased within the confines of lamp 230 during the reflective film deposition process so that the composition forming the reflective does not detrimentally affect the electrical characteristics of members 234, 236, 238 and 240. Further, both the pump flush and flush processes allow for a reflective film 242 to be placed onto th(R)lamp 230 after the related step involving heat have been accomplished to the lamp 230. Such allowance provides a reflective film 242 completely covering the outer surface of lamp 230, all of which film 242 cooperates to increase the efficacy of the lamp 230.

A tungsten-halogen lamp 250 having the benefits of the reflective film 242 completely covering its outer surface, void of a pinch seal, and having members 234, 238 and 240, and which is preferably yielded by the pump flush process is illustrated in FIG. 12. The lamp 250 has two relatively heavy filaments 252 and 254 which are interconnected by a spud 256. The lamp 220 has an inwardly curved portion 258 located near spud 256 which acts to provide the filaments 252 and 254 with two separate chambers.

A further tungsten-halogen lamp 260 having the benefits of reflective film 240, void of a pinch seal, and having members 234, 236, 238 and 240 and which is preferably provided by the pump flush process is illustrated in FIG. 13. The lamp 260 has a relatively heavy tungsten filament 262 located within its confines and spatially disposed by means of spacers 264 and 266. The tungsten filament 262, along with the spaces 264 and 266 are advantageously positioned within the confines of the lamp 240 due to the desired vertical orientation of the pump flush process of the present invention. The vertical orientation of the process itself, assists the filament and spacers by way of gravitation effects to find their correct orientation within the lamp 260.

It should now be appreciated that the practice of the present invention provides for flush and pump flush processes that yield a double-ended tipless light source particularly suitable for a variety of incandescent and vapor discharge lamps. The light source may be formed, in part, by molding techniques which yield accurate dimensions of various shaped light sources. The flush and pump flush processes are each carried out so as to reduce the contaminations typically experienced in the manufacturing of such lamp.

It should be further appreciated that the flush and pump flush processes of the present invention may be modified so as to allow reflective films tO be placed onto the light source without any detrimental affects to the electrical and mechanical components of the light source itself.

Further still, it should be appreciated that the practice of the present invention provides for light sources which simplify or reduce the mounting arrangement of various incandescent and metal vapor discharge lamps, a lighting unit particularly suited for the utilization of a low voltage type filament, a sealed beam headlamp units for automotive applications and a PAR lamp. All of the lamps are advantageously yielded by the flu(R)h and pump flush processes, along with reflective film deposition processes. The reflective film substantially increases the efficacy of the lamps themselves. The anticipated life of the lamps may be further improved by utilizing a low voltage filament within the light source itself.

What we claim is:

1. A tipless light source for a vapor discharge lamp comprising a double-ended tubular envelope having portions housing first and second electrodes located at opposite ends of said tubular envelope, a mercury metal and a halogen additive, said tubular envelope having a lower portion with a length which is substantially greater than the length of an upper portion of said tubular envelope, the function of the lower portion is to support the light source from an electrically conductive base of a lamp so that no other mount member or sealing arrangement is needed when the light source is lodged within the lamp, said first and second electrodes being respectively connected to first and second seal members sealed in opposite ends of said double-ended tubular envelope, said first electrode having means extending out of the upper portion of said tubular envelope by a predetermined amount, said second electrode extending out of the lower portion of said tubular envelope by a predetermined amount.

2. A light source for a vapor discharge lamp according to claim 1 wherein at least the upper portion housing said electrodes of said double-ended tubular envelope has its outer surface covered by a multi-layer infrared film.

3. A light source for a vapor discharge lamp comprising a double-ended tubular envelope having portions housing first and second electrodes located at opposite ends of said tubular envelope, a mercury metal and a halogen additive, said tubular envelope having a lower portion with a length which is substantially greater than the length of an upper portion of said envelope, the function of the lower portion is to support the light source from an electrically conductive base of a lamp so that no other mount member or sealing arrangement is needed when the light source is lodged within the lamp, said first electrode having means extending out of the upper portion of said tubular envelope by a predetermined amount, said second electrode extending out of the lower portion of said tubular envelope by a predetermined amount.

4. A light source for a discharge lamp according to claim 3 wherein at least the upper portion of said double-ended tubular envelope has its outer surface covered by a reflective film.

5. A high intensity of discharge lamp comprising;
    an outer envelope;
    an electrically conductive base connected to said outer envelope and having a screw-in portion;
    a double-ended inner envelope containing a vaporizable mercury metal and a halogen additive and having portions housing a first and a second electrode located at opposite ends of said inner envelope, said inner envelope having a lower portion with a length which is substantially greater than the length of the upper portion of said inner envelope, said lower portion being affixed to a central portion of said electrically conductive base and providing substantially the only support of said inner envelope lodged within said outer envelope, said first electrode extending out of the upper portion and being connected to an end of a first conductor having its other end appropriately connected to said electrically conductive base, said second electrode extending through a lower portion of said tubular inner envelope and appropriately connected to said electrically conductive base.

6. A high intensity discharge lamp according to claim 5 wherein said double-ended tubular inner envelope housing said electrode further comprises a reflective film covering its outer surface.

* * * * *